United States Patent
Protoolis et al.

(10) Patent No.: US 7,379,388 B2
(45) Date of Patent: May 27, 2008

(54) POSITIONING SYSTEM

(75) Inventors: Harry Protoolis, deceased, late of City Beach (AU); by Janet Graham, legal representative, City Beach (AU); Phil Doolan, Canning Vale (AU); Ross Stuart, South Perth (AU)

(73) Assignee: Nautronix (Holdings) PLC., Aberdeen (GB)

( * ) Notice: Subject to any disclaimer, the term of this patent is extended or adjusted under 35 U.S.C. 154(b) by 39 days.

(21) Appl. No.: 10/472,873

(22) PCT Filed: Mar. 22, 2002

(86) PCT No.: PCT/AU02/00342

§ 371 (c)(1),
(2), (4) Date: Oct. 18, 2004

(87) PCT Pub. No.: WO02/077663

PCT Pub. Date: Oct. 3, 2002

(65) Prior Publication Data

US 2005/0099891 A1    May 12, 2005

(30) Foreign Application Priority Data

Mar. 22, 2001 (AU) .................................. PR3894
Aug. 14, 2001 (AU) .................................. PR7029

(51) Int. Cl.
*G01S 3/80* (2006.01)
*G01S 5/18* (2006.01)

(52) U.S. Cl. .................................................. 367/118

(58) Field of Classification Search ................ 367/118, 367/128

See application file for complete search history.

(56) References Cited

U.S. PATENT DOCUMENTS

| | | | | |
|---|---|---|---|---|
| 3,559,161 A | * | 1/1971 | Raudsep | 367/117 |
| 4,053,889 A | | 10/1977 | Johnson | 343/17.2 PC |
| 4,097,837 A | * | 6/1978 | Cyr | 367/6 |
| 4,188,629 A | | 2/1980 | Johnson | 343/6.5 R |
| 4,809,005 A | | 2/1989 | Counselman, III | 342/352 |
| 4,924,446 A | | 5/1990 | Cyr | 367/6 |
| 4,951,263 A | | 8/1990 | Shope | 367/2 |
| 5,119,341 A | * | 6/1992 | Youngberg | 367/5 |

(Continued)

FOREIGN PATENT DOCUMENTS

AU    B-70788/87    10/1987

(Continued)

OTHER PUBLICATIONS

International PCT Patent Application No. PCT/AU02/00342, filed Mar. 22, 2002, International Publication No. WO 02/077663, published Oct. 3, 2002.

(Continued)

*Primary Examiner*—Dan Pihulic
(74) *Attorney, Agent, or Firm*—Welsh & Katz, Ltd.

(57) ABSTRACT

A system to position at least one vessel or object in an aquatic environment including: each vessel or object having a receiver connected thereto; and at least two transmitters; wherein each transmitter transmits a unique signal and the receiver on each vessel or object receives each unique signal and a calculation means determines the position of the vessel or object based on the received signals.

19 Claims, 9 Drawing Sheets

U.S. PATENT DOCUMENTS

| | | | | |
|---|---|---|---|---|
| 5,136,613 | A | 8/1992 | Dumestre, III | 375/1 |
| 5,168,473 | A | 12/1992 | Parra | 367/124 |
| 5,231,609 | A | 7/1993 | Gaer | 367/99 |
| 5,319,376 | A | 6/1994 | Eninger | 342/357 |
| 5,331,602 | A | 7/1994 | McLaren | 367/6 |
| 5,412,620 | A | 5/1995 | Cafarella et al. | 367/134 |
| 5,572,485 | A | 11/1996 | Troin et al. | 367/134 |
| 5,579,285 | A | 11/1996 | Hubert | 367/133 |
| 5,666,326 | A | 9/1997 | Holzschuh | 367/120 |
| 5,668,775 | A | 9/1997 | Hatteland | 367/19 |
| 5,686,924 | A | 11/1997 | Trimble et al. | 342/357 |
| 5,761,238 | A | 6/1998 | Ross et al. | 375/200 |
| 5,798,731 | A | 8/1998 | Lesthievent | 342/357 |
| 5,828,693 | A | 10/1998 | Mays et al. | 375/202 |
| 5,848,377 | A | 12/1998 | Wong | 701/226 |
| 5,875,402 | A | 2/1999 | Yamawaki | 455/502 |
| 5,978,739 | A | 11/1999 | Stockton | 702/6 |
| 6,941,226 | B2* | 9/2005 | Estep | 367/131 |
| 2005/0146985 | A1* | 7/2005 | Doolan | 367/118 |
| 2008/0008045 | A1* | 1/2008 | Basilico | 367/128 |

FOREIGN PATENT DOCUMENTS

| | | |
|---|---|---|
| AU | B-69949/91 | 5/1991 |
| AU | B-26099/92 | 12/1992 |
| EP | 0 651 344 B1 | 4/1999 |
| GB | 2089043 | 6/1982 |
| JP | 1090017 | 4/1989 |
| JP | 07-229959 | 8/1995 |
| JP | 08-136650 | 5/1996 |
| JP | 08-249060 | 9/1996 |
| JP | 09-011126 | 1/1997 |
| JP | 10111352 | 4/1998 |
| JP | 10282213 | 10/1998 |
| JP | 11125667 | 5/1999 |
| JP | 2001307774 | 11/2001 |
| WO | WO 85/02023 | 5/1985 |
| WO | WO 98/02759 | 1/1998 |

OTHER PUBLICATIONS

PCT International Search Report for International PCT Patent Application No. PCT/AU02/00342, filed Mar. 22, 2002, International Publication No. WO 02/077663, published Oct. 3, 2002.

PCT Notification of Transmittal of International Preliminary Examination Report with International Preliminary Examination Report for International PCT Patent Application No. PCT/AU02/00342, filed Mar. 22, 2002, International Publication No. WO 02/077663, published Oct. 3, 2002.

PCT Notification Of Receipt Of Demand By Competent International Preliminary Examining Authority for International PCT Patent Application No. PCT/AU02/00342, filed Mar. 22, 2002, International Publication No. WO 02/077663, published Oct. 3, 2002.

PCT Request for International PCT Patent Application No. PCT/AU02/00342, filed Mar. 22, 2002, International Publication No. WO 02/077663, published Oct. 3, 2002.

PCT Written Opinion for International PCT Patent Application No. PCT/AU02/00342, filed Mar. 22, 2002, International Publication No. WO 02/077663, published Oct. 3, 2002.

Derwent Abstract: Japanese Publication No. 08-248114 published Sep. 27, 1996, Application No. 07-056047 filed Mar. 15, 1995 of Yokogawa Denshi Kiki KK pertains to a Method For Measuring Locating Of Underwater Running Body.

Derwent Abstract: Japanese Publication No. 10-11352 published Apr. 28, 1998, Application No. 08-267192 filed Oct. 8, 1996 of Mitsubishi Heavy Ind Ltd pertains to a Guidance Device For Underwater Navigating Object And Its Method.

*Journal of Atmospheric and Oceanic Technology*, "The RAFOS System", by T. Rossby, D. Dorson, and J. Fontaine, Graduate School of Oceanography, University of Rhode Island, Kingston, RI 02881. © 1986 American Meteorological Society, vol. 3, pp. 672-679.

* cited by examiner

POSITIONING SYSTEM

CROSS REFERENCES TO RELATED APPLICATIONS

This application is based upon priority International Application PCT/AU02/00342 filed Mar. 22, 2002, International Publication No. WO 02/077663 A1 published Oct. 3, 2002, which is based upon priority Australian Patent Application No. PR 3894 filed Mar. 22, 2001 and priority Australian Patent Application No. PR 7029 filed Aug. 14, 2001.

FIELD OF THE INVENTION

The present invention relates to an aquatic positioning system, which enables the positioning and/or navigation of vessels and/or objects underwater or on the surface of a body of water. More particularly, the present invention relates to a positioning and navigation system for the underwater and surface acoustic positioning and navigation field, and is of particular benefit to the oil, gas and underwater construction industries.

BACKGROUND OF THE INVENTION

The positioning and location of vessels or objects in an aquatic environment is a necessary requirement in many industries. However, existing underwater and surface acoustic positioning and navigation systems do have a number of problems, including:
1. Only single vessel/user-positioning systems. That is, existing acoustic tracking systems are single user, and accordingly each user has their own set of underwater beacons.
2. Underwater acoustic pollution, causing interference with ocean based animals (e.g. whales) and other acoustic systems. Existing acoustic tracking systems use ping or chirp signalling similar to the acoustic signals used by ocean based animals. Thus from a system view, biological noise can interfere with tracking systems, and further multiple acoustic tracking systems can interfere with each other.
3. Limited range of coverage—due to the physical properties of deepwater on acoustic signals interfering with the transmitted signal (e.g. ray-bending, signal dispersion, vessel noise, etc.).
4. The need, time and cost to re-deploy the sea-floor components (beacons) for each drilling or construction site. As noted above, existing acoustic tracking systems are single user and cover a relatively small area of approximately one square kilometre. Users are required to demobilise their own underwater infrastructure when operations move outside the tracking boundaries, which is an expensive process.

Currently available systems being used in the oil and gas and underwater construction industry do not address the problems listed above and in fact most likely contribute to the underwater acoustic pollution.

An example system currently used in the positioning of vessels is the long base line system. Existing Long Base Line (LBL) systems use multiple beacons to form up to a 1 km base line. The user positions itself relative to the base line. The position of the beacons must be determined and the position calibration is performed by sailing around a beacon, and range tracking the beacon relative to the differential global positioning system (DGPS) position. The data is then post-processed to determine the beacon position.

This system has been the best-known attempt to date to tackle part of the identified problem. However, deploying numerous sea-floor components (say 80) along the path of an area of operation has still been for single vessel use, has significant deployment overhead and has added to the acoustic pollution problem.

Communication using digital spread spectrum (DSS) signalling has also been used in this industry for various applications, however the range and reliability of these systems have so far been unable to satisfy the overall problem.

This combination of problems has been difficult to solve due to the known signalling techniques (means for transmitting acoustics) being unable to provide a means for communicating over long distances underwater (>2 km) with the required level of reliability and power consumption.

OBJECTIVES OF THE INVENTION

It is therefore an object of the present invention to provide a system for the positioning of vessels and objects in an aquatic environment. More specifically the present invention seeks to provide a system which enables a number of vessels and objects to be located and positioned within a relatively large aquatic environment without significantly compounding problems associated with acoustic pollution.

BRIEF SUMMARY OF THE INVENTION

With the above objectives in mind, the present invention provides a system to position at least one vessel or object in an aquatic environment including:

each vessel or object having a respective passive receiver connected thereto;

at least two transmitters located below the surface of said aquatic environment and raised above the bottom of said aquatic environment; and a location means to determine the position of each said transmitter;

wherein each transmitter transmits a signal that uniquely identifies each transmitter and is transmitted independent of a command or interrogation signal, and the receiver on each vessel or object receives each signal and a calculation means determines the position of the vessel or object based on the received signals.

The system may be configured such that the transmitters transmit their signals at predetermined times. Each transmitter may be formed in a housing or station located on the ocean bed or bottom of the body of water in which the system is installed. Ideally, the housing will include a means to float or suspend the transmitter above the ocean bed. In the preferred embodiment, a means is also included to determine the position of the transmitter in relation to the housing. This may include a transmitter located on the transmitter unit, and hydrophones positioned on the housing to enable calculation of position of the transmitter unit. Ideally, the transmitters will also be able to self calibrate with respect to each other transmitter. In order to synchronise clock signals, each transmitter may be configured to regularly suspend transmission of its own signal, and receive the signals transmitted from nearby transmitters.

The receivers may be attached to vessels either on the top of the body of water or located underwater. Further, the receiver may be attached directly to the vessel or object, or alternatively may be suspended from the vessel or object.

Ideally, the receiver should be configured to minimise interference from any noise emanating from the ship or object to which the receiver is connected.

These and other objects, aspects, advantages and features of the present invention will be more fully understood and appreciated upon consideration of the following detailed description of a preferred embodiment, presented in conjunction with the appended claims and accompanying drawings.

DETAILED DESCRIPTION OF THE INVENTION

A detailed description of the preferred embodiment and best mode for practicing the invention are described herein.

The application has described an underwater station in co-pending Australian patent application number, claiming priority from Australian provisional number PR7029 the contents of which are herein disclosed by way of reference.

In the preferred embodiment of the present invention the system will include two main components, namely:
1. Station—Ideally, the stations (1) will transmit a DSS signal and use inter-station communication techniques to bring all clocks into synchronisation.
2. Passive Receiver—Preferably, the receiver (4) will pick up the signals from the stations (1) and calculate its own position based on the comparison between the time of arrival from all the various stations (1) and using information embedded in the signal regarding the station (1).

In practice the system would also ideally include a third component, namely:
3. Graphical User Interface (GUI)—The display control unit (DCU) (18) will provide the operator with a display having the position solution, performance monitoring and quality control data.

Figure 5:
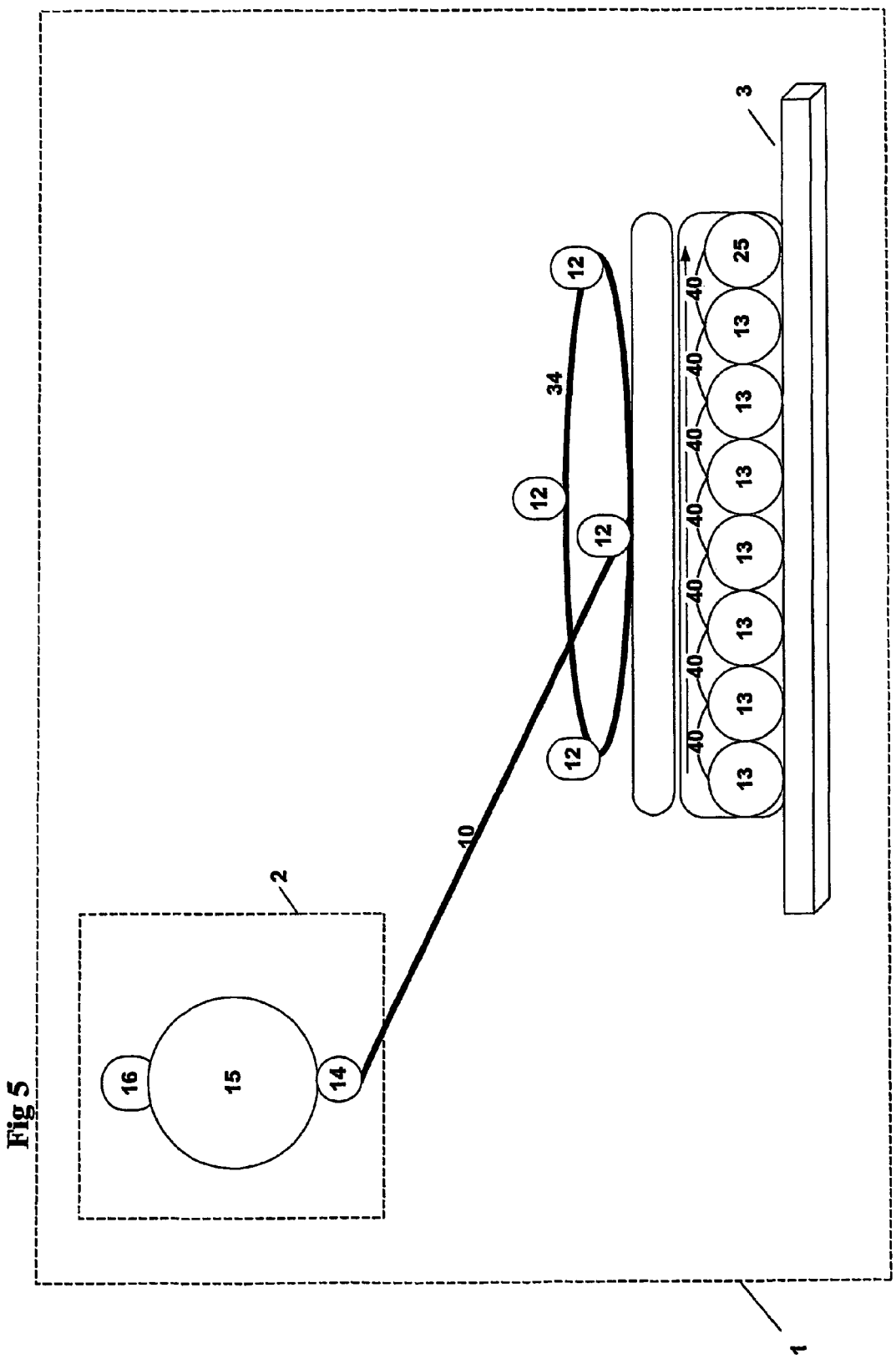
FIG. 5 shows a basic configuration of one embodiment of the underwater station.

The fundamental idea of the system is to lay a grid (9) (FIG. 3) of active transmitting stations (1) on the sea floor. Each station (1) may be a single sub-sea component having a transmitting hydrophone (16), battery modules (13) (see FIG. 5) and related equipment. The stations (1) transmit a DSS signal and use inter-station communication techniques to bring all clocks into synchronisation. The receiver (4) then acquires the signals and calculates its own position based on the comparison between the time of arrival of signals from all the various stations (1) and where applicable using information embedded in the signals regarding the stations (1) location.

The grid (9) may be permanently deployed and shared between multiple users. It can be laid out on the ocean floor in an area of interest to all parties and left there so that no further manual calibration of the beacons is required. Similarly, a new user would not have to deploy additional beacons over the existing network.

Ideally the station (1) should not be deployed in valleys or where underwater objects obstruct the acoustic signal. The stations (1) should be deployed where the field of view is maximised. The station (1) spacing can be influenced by acoustic pollution, and the dominant source of acoustic pollution is surface vessels (5). It will be understood that the system will only operate when the received signal plus the processing gain is louder than the surface vessel (5). For very loud vessels (5) the output power of the station (1) can be increased which depletes the station battery modules (13) at a higher rate and hence shortens the station (1) life. Alternatively if the area of operation is less than 10 km then the station spacing can be reduced thus increasing the power of the received signal.

The grid (9) is capable of organic growth. That is, any number of additional stations (1) can be added to the grid (9). Once a new station (1) has been deployed, normal data processing, positioning or surveying operations can take place immediately over the vicinity of the new station (1).

Figure 3:
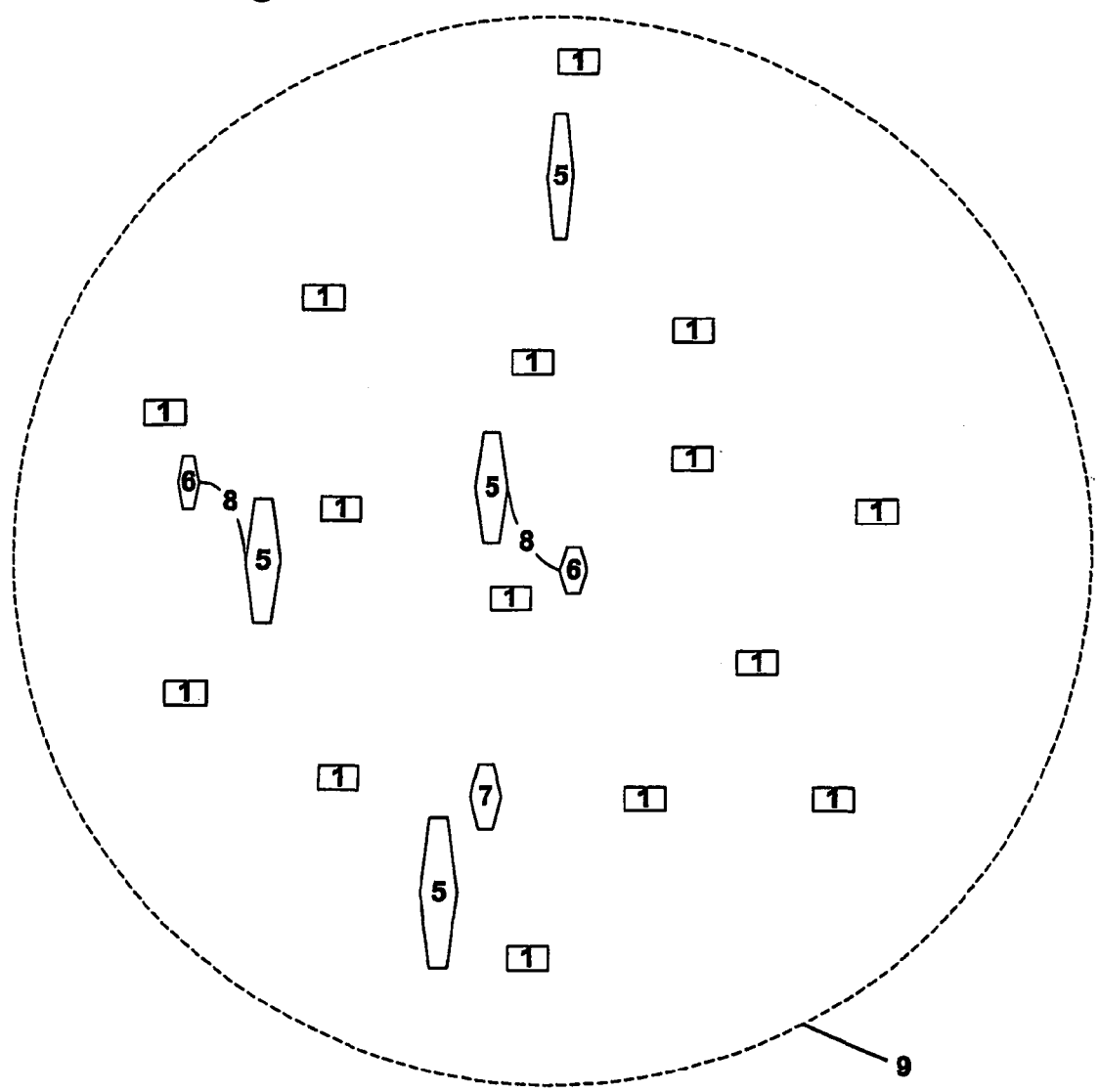
FIG. 3 shows a practical arrangement of stations with irregular station positioning.

The grid (9) layout, in an ideal situation, may form a hexagonal grid (9) (FIG. 4) with approximately 7 to 8 km between each station (1), with the ability to position outside this area with six stations providing coverage of approximately 100 km$^2$. Grid (9) cells can be larger, dependent upon the sound speed profile of the area. Alternatively, triangular, octagonal, or diamond grids (9) may be deployed. In a diamond grid arrangement, the points of the diamond are in the middle of each side of a square. A 15 km total distance from station (1) to receiver (4) (slant range) is the preferred maximum and, depending on local conditions, the slant range can be as low as 3 kms. Expanding the grid (9) can cover an arbitrarily large area. Each of the additional stations (1) would be placed within approximately 8 km of the existing network until the limit of available distinct station (1) codes is reached. As can be seen in FIG. 3, the grid (9) need not expand symmetrically but rather may be designed to fit the environment or area to be covered.

The minimum station (1) spacing should ideally be no less than the water depth in order to maximise the accuracy of the long base line system. For example, if the water depth is 3.5 km, then the minimum station (1) spacing should be no less than 3.5 km (12 square km). To economically deploy the system the station (1) spacing should be as large as possible. Ideally, the station will be spaced at least 2 km apart. A preferred system has been designed for 8 km station (1) spacing in a hexagonal grid (9) pattern (104 square km). For high accuracy underwater construction the system may deploy a small grid (9) with 0.5 km station spacing around the construction site.

Preferably, the system will be built with station (1) redundancy throughout the grid (9) to ensure that any one in four stations (1) can cease transmission with no impact on performance. Redundancy will ideally be included in the design to ensure that the system is capable of maximum operation time. Even during the removal or addition of a station (1), the grid (9) will ideally remain operational. Further, operators will ideally be able to monitor the grid's (9) operation via a user's DCU (18), which would also report operational faults in the stations (1).

The system will ideally be designed to handle interference from other acoustic sources using unique code modulation techniques. The system DSS coding is designed to maximise noise immunity. The coding system is also optimised for providing maximum immunity from other stations (1). That is, the receiver (4) can receive multiple station (1) signals simultaneously, and simultaneous system signals do not interfere with each other.

Ultimately, the system should reduce the acoustic pollution problem that currently exists in active areas.

In a basic arrangement, the system may be configured with only two stations (1) to provide a rough estimate of a vessels (5) position. Once a receiver (4) has located itself within a cell or grid (9) then two or more stations (1) signals are required for a position. Whilst two stations (1) provide minimum position accuracy, additional stations (1) can improve this accuracy.

Figure 4:
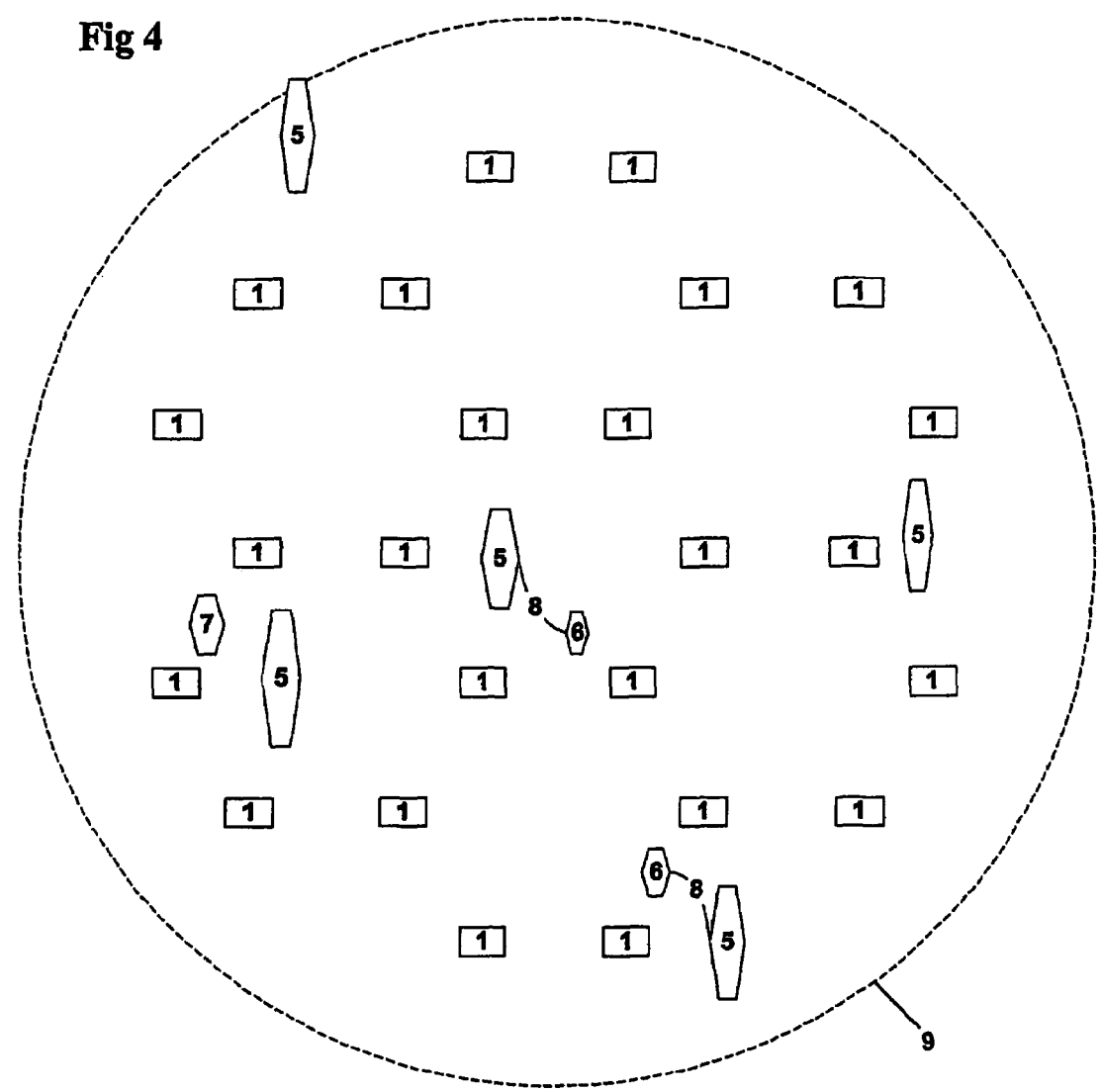
FIG. 4 shows a possible grid layout with regular (hexagonal) station positioning.

The system of the preferred embodiment uses a minimum of six stations (1) arranged in a 110 km$^2$ hexagonal grid (9). In order to cover a larger area, the grid (9) pattern can be repeated using up to thirty-two stations (1) within a single area. FIG. 4 shows a typical station (1) layout that uses twenty-four stations (1) to cover an area of 920 square kilometres. In an alternative arrangement a square grid (9) or an irregular (FIG. 3) grid (9) pattern may be employed, depending upon the topography of the seabed and the environmental conditions of the area.

Figure 9:
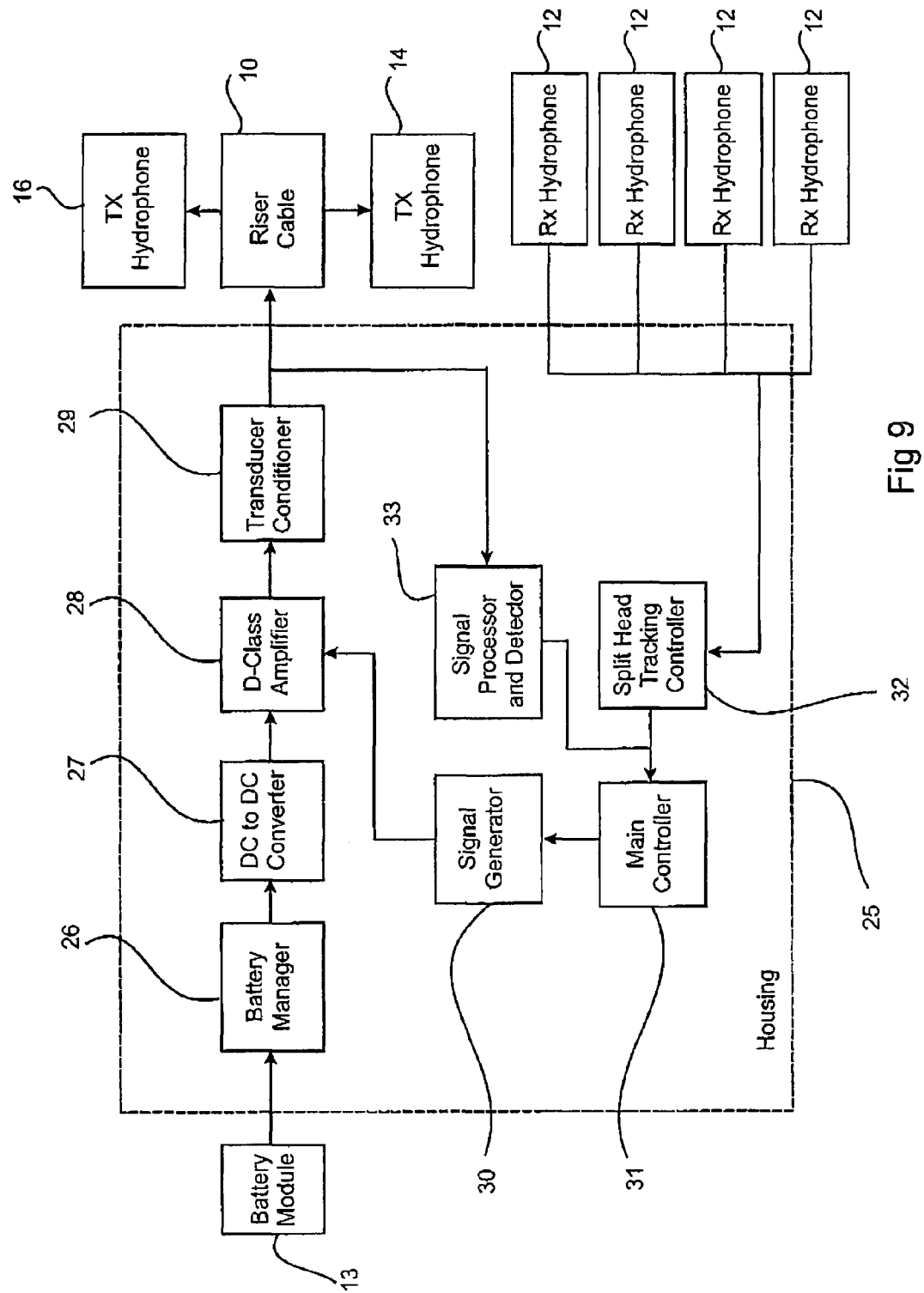
FIG. 9 shows a block diagram of the station electronics housing and sub-assemblies.

The station electronics ideally includes a number of sub-assemblies mounted in a housing (25) (FIG. 9) designed to withstand extremely high pressures. The sub assemblies can include:

viii) main controller (31) and signal generator (30)
ix) signal processor and detector (33)
x) high voltage DC-to-DC converter (27)
xi) high power D-class amplifier (28)
xii) transducer conditioner (29)
xiii) battery manager (26)
xiv) split head tracking controller (32)

The main controller (31) oversees the operation of the whole station (1). It is responsible for generating all the precision internal timing, and decoding all the messages from the signal processing and detector (33) unit and acting upon them. It is also responsible for generating the DSS signalling information. The signal generated by the main controller (31) is amplified through the D-class amplifier (28) and then through the transducer conditioner (29) to the transmitting hydrophone (16) itself. The D-class amplifier (28) is powered from a high voltage generated from the DC-to-DC converter (27). A signal processor and detector (33) is responsible for detecting an incoming DSS signal and then extracting further information encoded within the signal for processing by the main controller (31).

There are two further internal assemblies:

The first is the battery management circuitry (26), which ensures that the maximum energy can be extracted from the battery modules (13). It also monitors fault conditions in any of the battery modules (13) and acts to minimise the amount of time that the station (1) is not transmitting. Fault information is also relayed by telemetry link to any surface vessels (5) for remedial action.

The second extra assembly is the split head tracking controller (32), which calculates the transmitting hydrophones (14) position with respect to the station (1).

Each station (1) transmits a uniquely encoded DSS signal at a regular interval. The system ideally uses a coding system that allows for the simultaneous reception of multiple signals, (for example up to 16 stations). The coding system should also provide improved noise immunity from interference sources like noisy ships or other acoustic tracking systems.

Figure 1:
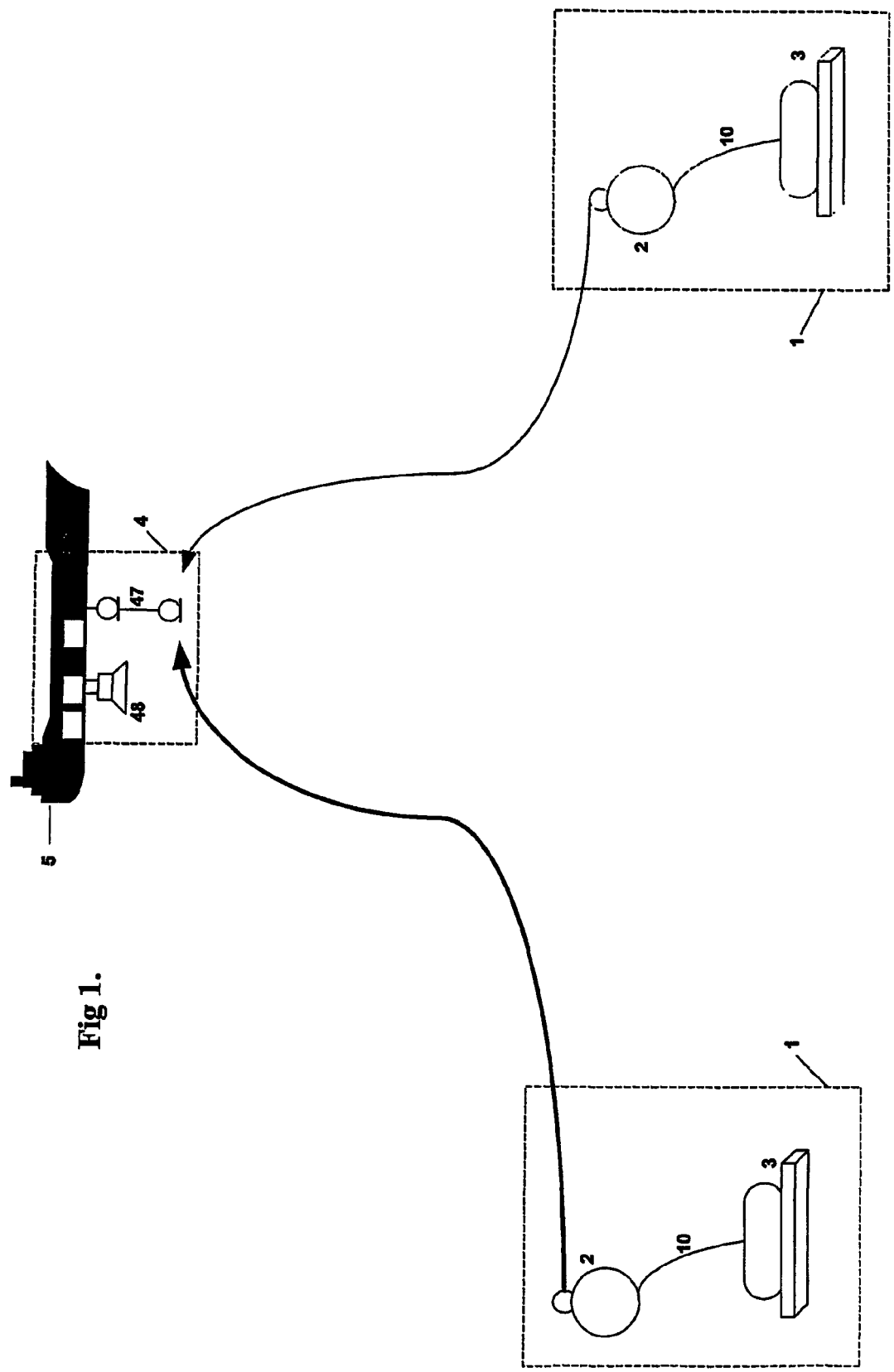
FIG. 1 shows a possible application of the underwater station in accordance with the present invention.
Figure 2:
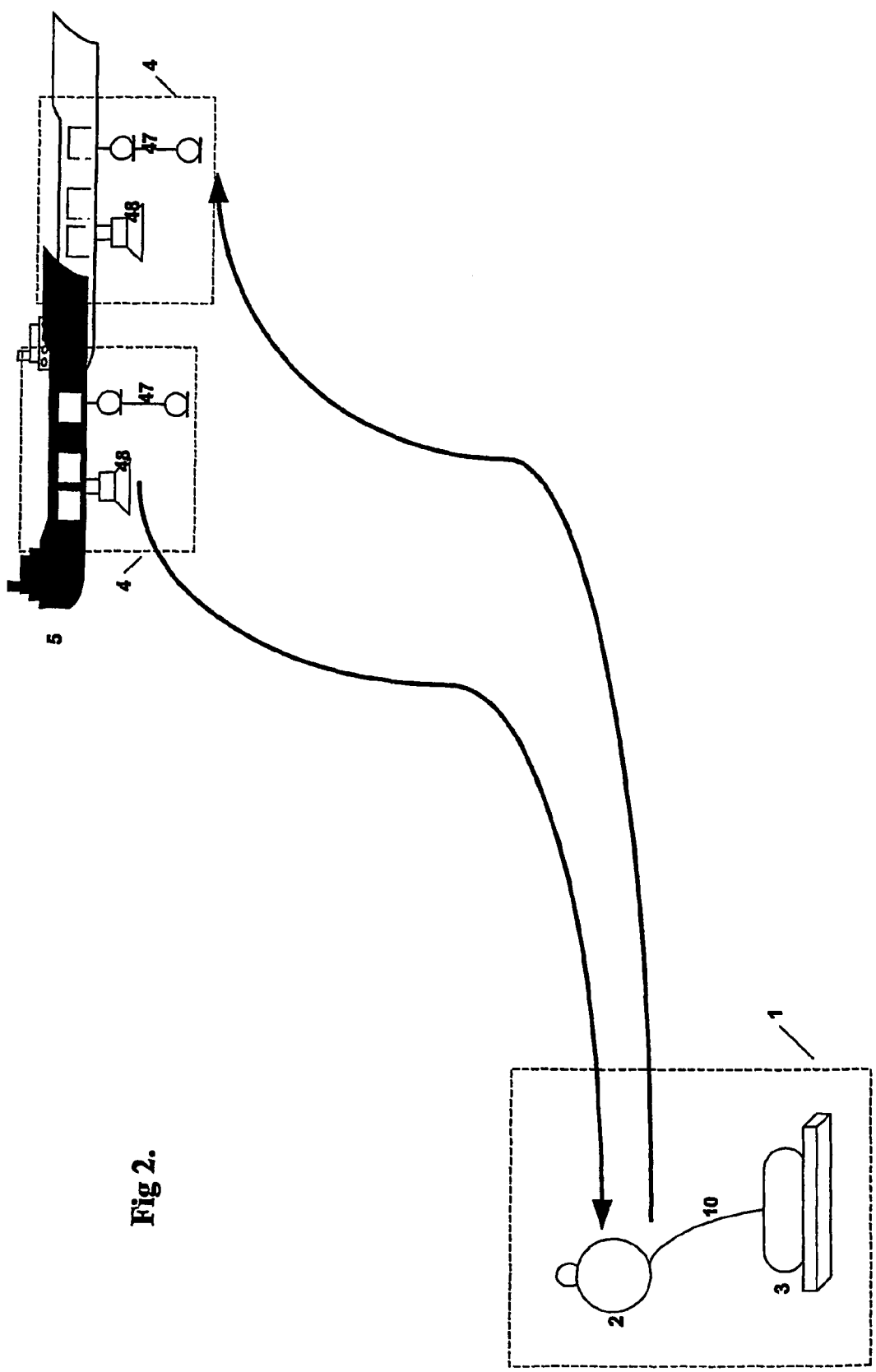
FIG. 2 shows the effect of ray bending on one application of the present invention.

The depths at which the stations (1) are deployed may vary considerably, as does the topology of the ocean floor. The velocity of sound profile can cause the signal from one station (1) to refract towards the surface. This phenomenon known as "ray bending" also results in the signals near the sea floor being directed into the ground due to natural elements such as temperature, salinity and conductivity gradients (see FIG. 2). The effect of acoustic ray bending increases with water depth. The preferred system uses an 8 km station (1) spacing, which requires the acoustic signal to propagate horizontally. Because of the effect of ray bending in deep water, if a station (1) transmits an acoustic signal from the bottom of the ocean, then the horizontal acoustic signal will be refracted into the ground and a surface vessel (5) 8 km away will not receive the acoustic signal. To avoid this problem and allow inter-station communication, the transmitting hydrophone (16) may be floated off the bottom of the ocean floor by up to 250 m, although greater lengths may be accommodated if necessary. That is, the transmitting hydrophone (16) elements are preferably raised above the sea floor in Split Head Modules (SHM) (2). The SHM (2) includes a flotation module (15), which carries the main transmitting hydrophone (16) above the station (1). The SHM (2) is connected to the station (1) via an electrical riser cable (10). As an alternative, rather than floating the transmitter, the transmitter may be fixed or supported a predetermined height above the sea floor.

The SHM (2) overcomes problems of ray bending by transmitting the acoustic signal several hundred meters above the station (1). The acoustic signal is refracted down but will eventually refract up to be received by a surface vessel (5).

Generally speaking, the height of the SHM (2) above the station (1) must be increased as a function of water depth. However, since the station (1) tracks the SHM (2), the height should be kept to a minimum.

Following deployment of the stations (1), the SHM's (2) may be deployed. The deployment time of the SHM's (2) may be configurable. The SHM (2) of the preferred embodiment will have positive buoyancy and be tethered by a riser cable (10).

During the deployment of the station (1) the SHM (2) may be mounted on the station (1). When the station (1) is on the seabed, an acoustic command may then be sent to the station (1) to release the SHM (2), which will allow the SHM (2) to float on the end of its riser cable (10) to a predetermined depth.

The amount of flotation in each of the SHM's (2) can be adjustable and the amount of the SHM (2) riser cable (10) deployed can also be adjustable.

Figure 8:
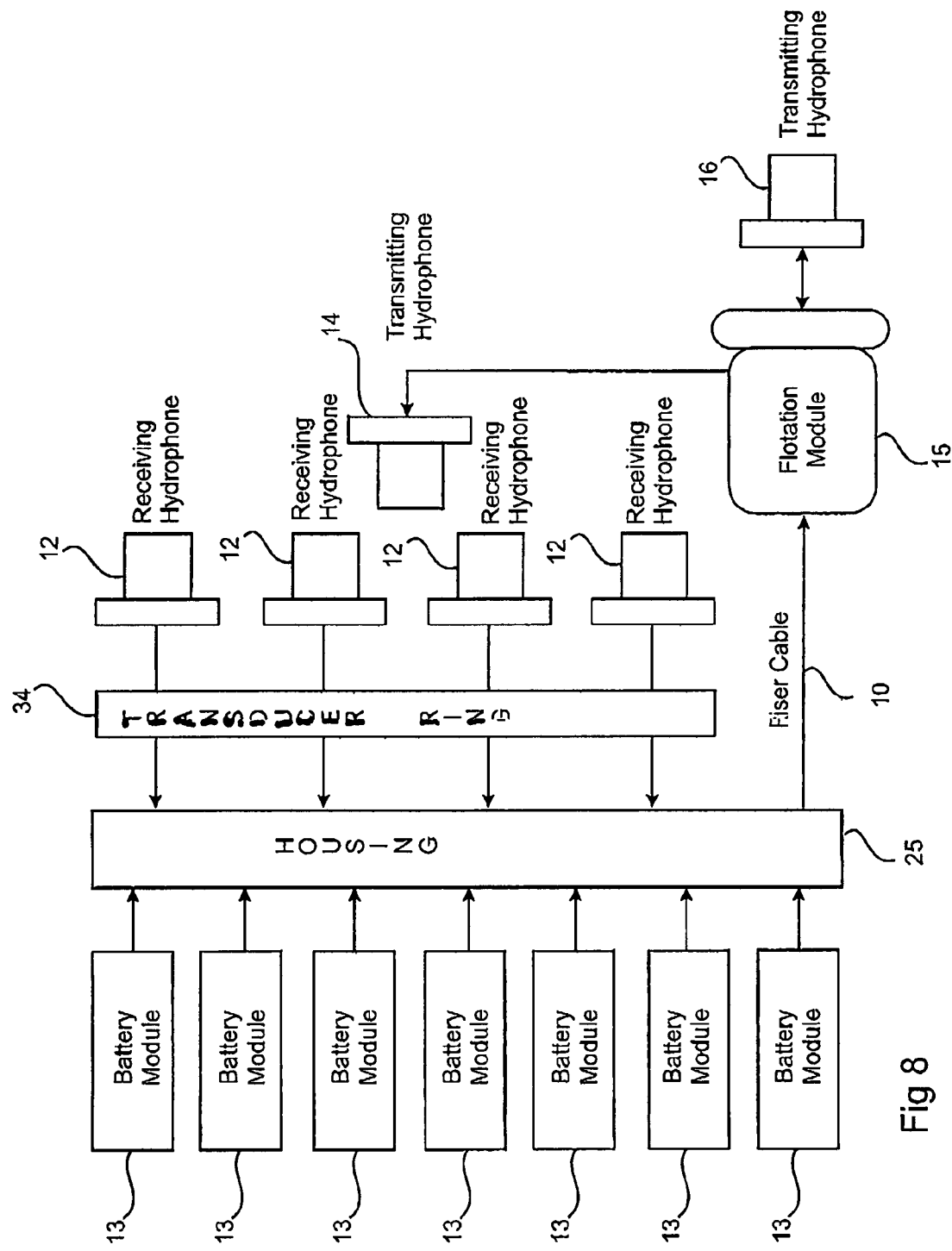
FIG. 8 shows a block diagram of one embodiment of the underwater station.

The station (1) may also include a chassis (3) component, which is a mechanical system that transports, houses and supports the electronic circuitry of the station (1). The SHM (2) can move, so it is necessary to track its position relative to the station (1). That is, to maximise the tracking accuracy of the system, the SHM (2) should be tracked by the station (1). This will determine its position relative to the mean station (1) position. In order to track the position of the SHM (2), in the preferred system a split head tracking controller (32) in one embodiment is also installed on the chassis (3), so that the exact position of the SHM (2) can be factored into ranging calculations. The split head tracking controller (32)

uses one transmitting hydrophone (14) mounted on the SHM (2) and four receiving hydrophones (12) mounted on the station (1). The four receiving hydrophones (12) can be mounted on the extreme corners of the chassis (3) to maximise the angles seen by the receiving hydrophones (12) for position calculations and for redundancy (see FIG. 8).

The Split Head Tracking System (SHTS) will ideally include a transmitting hydrophone (14) in each of the SHM's (2), the four receiving hydrophones (12) mounted on the chassis (3) and the split head tracking controller (32). The receiving hydrophones (12) should be mounted at points to provide a view of the SHM's (2) above, and at points as far apart on the chassis (3) as possible. The split head tracking system triangulates the transmitting hydrophone (14) (see FIG. 5) signal to provide a solution for the position of the SHM (2) for the split head tracking controller (32). The tracking system may use high frequency Short Baseline (SBL) techniques to accurately track the position of the transmitting hydrophone (14) relative to the station (1). The positioning may also be corrected for the pitch, roll and heading of the station (1) via the heading and tilt sensor (35), to give an absolute position of the SHM (2).

When it is necessary to recover the station (1) the SHM (2) may be damaged during the recovery phase. To avoid this, an acoustic command may be sent to the station (1) to release the riser cable (10) to allow it to float freely to the surface for separate recovery. Alternatively, the riser cable (10) may be retracted to store the SHM (2) safely before recovery of the station (1).

The station (1) can be fitted with a large number of external battery modules (13) to power the transmitters. The battery modules (13) can contain either alkaline or lithium batteries (or other energy sources). Each battery module (13) can incorporate smart battery technology so that the battery module (13) can monitor its own power consumption and expected life. The battery modules (13) can be capable of switching off the supply to a particular controller, if its power consumption is too high.

The signals from the four receiving hydrophones (12) of the split head tracking system could be wired in parallel to the main controller (31). This structure is redundant because only three receiving hydrophones (12) are needed in order to measure the position of the transmitting hydrophone (16). Whilst possible, it is not practical to have two separate sets of battery modules (13), therefore the battery modules (13) are wired individually to the main controller (31). Each battery module (13) can be fitted with internal intelligence, which will allow the battery module (13) to monitor the power consumption of the battery modules (13) and disconnect the power if the power consumption is too high. Battery modules (13) can be daisy chained into small groups. If a power cable (40) shorts (see FIG. 5), then the group or individual battery module (13) is placed off-line. The battery modules (13) can also monitor short circuit or overload conditions. If the short circuit or overload is removed then the battery module (13) will place itself back on-line.

The station is designed to be deployed off the back of an offshore supply vessel (5) and sink down to the ocean floor. The current embodiment is designed to operate at a maximum depth of 3,500 metres, which can be expanded if required. The station (1) exterior will need to be designed with a view in mind to withstand the day-to-day rigors of offshore industrial environment knocks, bumps, salinity, external pressure, temperatures, growth of algae and coral etc.

The receiver (4) can be installed on a ship or other vessel and will also need to withstand the operational conditions and requirements of the industry. These include day-to-day operational use, knocks, bumps, liquid spillages, salinity, etc. The receiver (4) will ideally include the following components:

Hydrophone Receiver Array (47)
Analogue to Digital Converter (ADC) and Digital to Analogue Converter (DAC) Module (41)
Beam Former (20)
Processor (42)
Display Control Unit (DCU) (18)
Power Amplifier (46)
Transmitting Hydrophone (48)
Remote Access Modem (43)
Inertial Sensor (45)
Array Power Cable (21)

Figure 6:
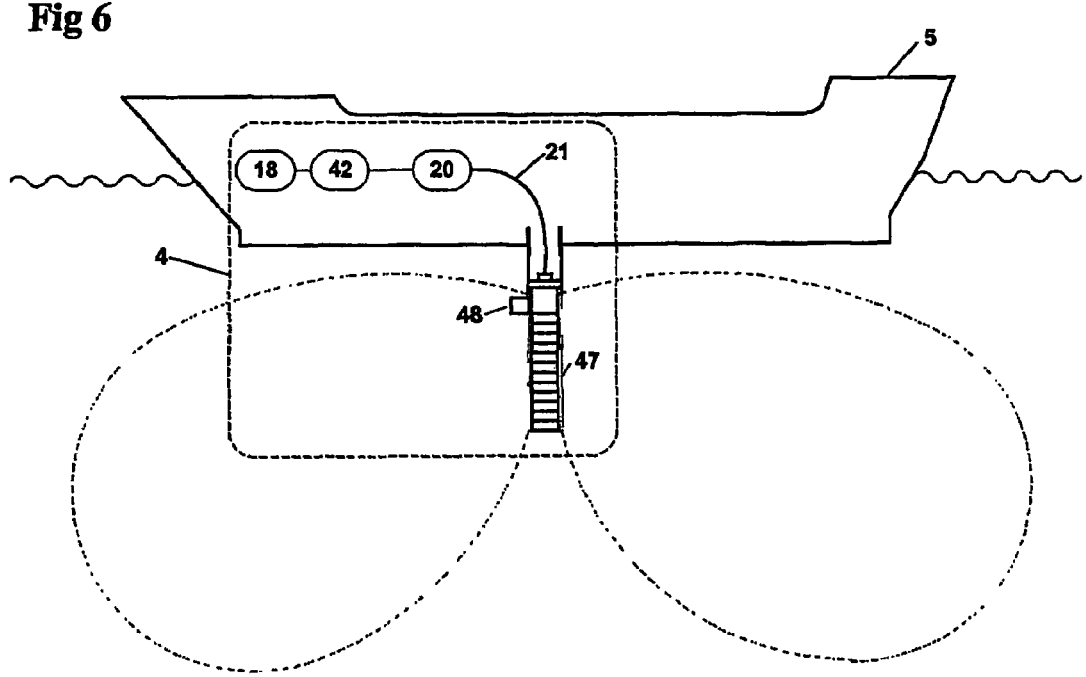
FIG. 6 shows a possible receiver arrangement.
Figure 7:
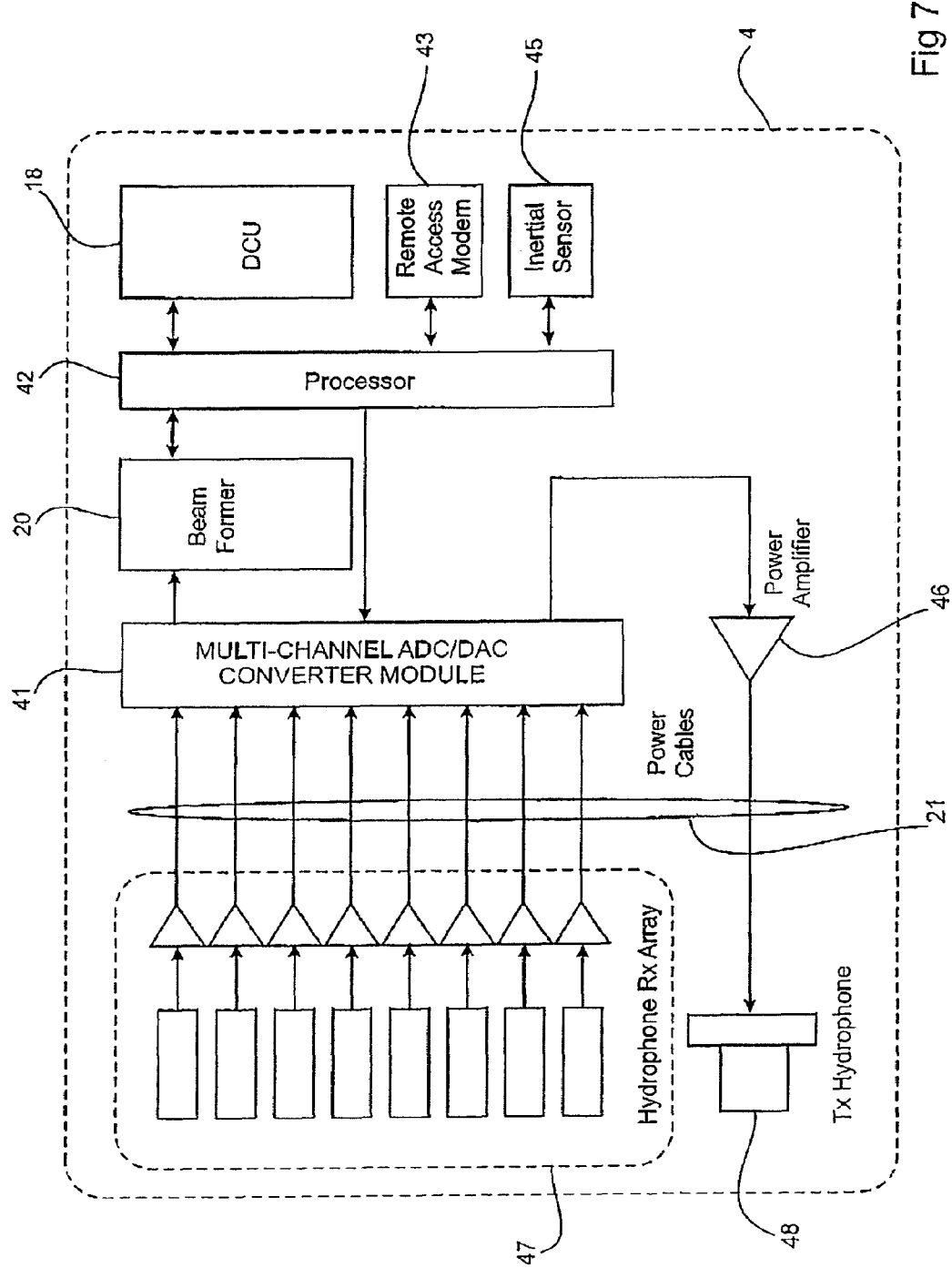
FIG. 7 shows a receiver block diagram of the preferred embodiment.

The signals from the hydrophone receiver array (47) are fed to a multi-channel ADC/DAC converter module (41), which digitises the received signal (see FIG. 7). To minimise the amount of received noise generated by the vessel, the digital signals are then processed by the beam former (20). The clean signal is then sent by the processor (42) to be displayed on the DCU (18) showing the location of objects to the user. If the user requirement is to send signals from the vessel (5) to the station (1), those signals are then generated in the processor (42), passed through the power amplifier (46) and array power cable (21) to the transmitting hydrophone (48), which then sends those signals through the water (see FIG. 6).

A remote access modem (43) is fitted to the processor so that the calibration data or other information can be transferred to other vessels or operators as required. An inertial sensor (45) is also fitted to the processor (42) to allow corrections to be made for the cyclic movement of the vessel (5) due to local environmental conditions.

In order to position a vessel (5), remotely operated vehicle (ROV) (6) or autonomous underwater vehicle (AUV) (7) within the grid, it is fitted with a receiver (4) containing a hydrophone receiver array (47) and an array power cable (21). The signals from at least three of the stations (1) must be detected at this hydrophone receiver array (47) in order to accurately calculate the position of the receiver (4). In normal tracking mode, the receiver (4) only listens to signals being sent from the stations (1), so an unlimited number of receivers (4) can operate within the grid (9). If redundancy is required, multiple receivers (4) can be fitted to the same ship (5). The receivers (4) could operate completely independently of each other without the need for any master slave arrangements.

The hydrophone receiver array (47) may be a multi element vertical array designed to receive the signals from the stations (1). In most cases the vessel (5) is a large source of acoustic noise. Accordingly, the multi-element array is ideally electronically beam-formed to steer a beam away from the high noise of the ship so as to achieve array gain. In some circumstances, the system may be used to position a large vessel (5) whose main sources of noise are the 500 to 2000 Megawatt thrusters that can generate up to 200 dB of acoustic noise. The present system should be able to operate under normal vessel (5) operating conditions, and be capable of receiving signals from the stations (1) in the presence of the vessel (5) noise. Ideally the hydrophone receiver array (47) should be deployed deeply enough to clear the ships thrusters, and the top of the hydrophone receiver array (47) should have a clear view to the station (1).

The difference between the present preferred system and a traditional long baseline tracking system is that the ship or vessel (5) is passive. That is, the vessel (5) makes no sound (other than normal operational noise) unlike those vessels using traditional systems, which transmit signals to interrogate beacons. The vessel (5) has the ability to calculate its position by receiving and processing signals received from the various stations (1). This passive receiving enables multiple vessels (5) to operate within the same area without interfering with each other.

Once a vessel (5) is in the vicinity of a grid (9), it will ideally be able to receive a minimum of three stations (1) in order to position itself. Accordingly, in the preferred arrangement, the vessels (5) need to be within range of four stations (1) to provide a degree of redundancy.

The signal to noise ratio should be such that a vessel (5) with a high level of self noise will be able to position itself accurately, therefore, for quieter vessels (5) the degree of accuracy of positioning will be higher. A quieter vessel (5) may be able to receive signals from up to ten stations (1).

There is a capability to transmit command and control telemetry from vessels (5) to stations (1), but this would only be included for system maintenance, time synchronisation, and system control purposes and would not be used for normal operations.

Not only will the system be able to track vessels (5) on the surface of the water, but the system will be capable of tracking vessels (5) and objects underwater, for example, ROV's (6) or AUV's (7).

The ROV (6) could typically be connected to the surface via an umbilicus (8). The ROV (6) may be fitted with a means capable of detecting the time of arrival of the signals from the stations (1) and transmitting that information up the umbilicus (8) to a receiver (4) on the surface, which could solve for position of the ROV (6).

In addition to ROV (6) support, the system can also support an AUV (7). The difference between the two solutions is that the processor on board the AUV (7) would have to solve for position, as it has no galvanic means of communication with a surface vessel (5).

The system could also be used to assist with construction activities underwater. The main task of underwater construction is the mating together of pieces of the construction with great accuracy. The problem with any mating operation, e.g. a pipe going into a fitting or a platform locating into a pin or any other assembly operation; is the dramatically increased requirement for accuracy.

Typically, underwater construction requires accuracy in the 10's of millimetres in order to perform most operations. The notional ideal of accuracy is currently 20 mm.

The primary challenge in achieving this accuracy is compensating for the variation in the speed of sound in water over any distance. It is difficult to take a time of flight measurement and turn it into a distance measurement when the speed of sound in water is changing.

The system could use a specialised receiver unit fitted to the piece being maneuvered into position and another receiver unit, acting as a reference, fitted to the unit to which the system is locating. By using the stationary reference receiver to correct for any variations in the speed of sound the system should be able to provide an increased accuracy on the relative position of the object being maneuvered.

The system can also provide improved communications by making use of DSS signalling from station (1) to station (1) to take data collected in the vicinity of one station (1), telemeter it through the network and deliver it at some remote point.

As data rate achievable is low, and there is a very high-energy cost per bit, the preferred embodiment achieves a data rate around 50 bps over long range communications, although higher levels of transfer could be achieved over close range communications.

Such data rates are suitable for the monitoring of wellheads, alarms and communication with AUV's (7).

The unique coding of each sub-sea station (1) used in the transmitted signals, overcomes interference from other acoustic systems. This creates an environment where a relatively sparse network of stations (1) and passive vessel (5) receiver (4) systems, can significantly reduce the volume and range of acoustic noise in the sub-sea environment. The DSS signalling also dramatically reduces the acoustic pollution and its effect on mammalian marine life.

Each station (1) transmits acoustic signals to the neighbouring stations (1); this facilitates newly added stations (1) being able to self-calibrate their actual position. This, combined with the ability to locate the stations (1) approximately 8 km apart, and with each station (1) having a battery power supply capable of up to 12 months continuous operation, results in a significantly reduced deployment requirement.

The acoustic signal used and the use of a SHM (2) that floats above the sub-sea station (1) are able to compensate for the known physical characteristics (e.g. signal refraction) of deepwater. The DSS signal addresses the signal dispersion and noise interference effects and the SHM (2) is able to transmit the signal such that the effect of ray-bending (curving of the signal towards the surface) is counter-acted.

With a combination of technical, physical and deployment problems addressed with the present positioning and navigation system the following are the key advantages that can be gained:

1. Multi-vessel/user positioning—enabling a reduced cost for larger fields.
2. Reduced acoustic systems in the environment—reducing the underwater acoustic pollution problem.
3. Increased signal range (>2 km) enabling fewer sub-sea stations (1) to cover a given area. This in turn reduces the overall system cost and logistical time and cost overhead required for deployment in comparison to existing positioning systems.
4. A further advantage of the system is the ability to discriminate between signals generated by the stations (1) and acoustic noise generated by other tracking systems.

These advantages can be achieved by taking advantage of a number of aspects including:

1. DSS signalling to achieve longer distance underwater signal transmissions.
2. Floating the SHM (2) above the sea floor in order to compensate for the effect of refraction in deeper water over the desired distances.
3. Having passive receiver (4) systems (ship, drill rig, ROV's (6), etc.) calculating their position from the signals received from the sub-sea stations (1) within range to enable the multi-vessel/user capability.

Whilst the method and apparatus of the present invention has been summarised and explained, it will be appreciated by those skilled in the art that many widely varying embodiments and applications are within the scope of the present invention, and that the information contained within this document should not be construed as limiting the scope of this invention. Furthermore, although embodiments of the invention have been shown and described, it is to be understood that various modifications and substitutions, as well as rearrangements of equipment, parts, components and process steps can be made by those skilled in the are without departing from the novel spirit and scope of the invention.

What is claimed is:

1. A system to position at least one vessel or object in any aquatic environment including:

each said vessel or object having a respective passive receiver connected thereto;

at least two transmitters located below the surface of said aquatic environment, and raised above the bottom of said aquatic environment, each transmitter being attached to a respective housing located at the bottom of the aquatic environement; and a location means to determine the position of each said transmitter;

wherein each said transmitter transmits a signal that uniquely identifies each said transmitter and is transmitted independent of a command or interrogation signal, and said receiver on each said vessel or object receives each said signal and a calculation means determines the position of said vessel or object based on the received signals.

2. A system as claimed in claim 1, wherein each said transmitter transmits its signal at predetermined times.

3. A system as claimed in claim 1, wherein said transmitter is a transmitting hydrophone.

4. A system as claimed in claim 1, wherein said transmitter is fixed above the floor of said aquatic environment.

5. A system as claimed in claim 1, wherein said transmitter is attached to a floatation means and is floated above said housing.

6. A system as claimed in claim 5, wherein said location means tracks the position of said flotation means.

7. A system as claimed in claim 5, wherein said location means includes a transmitting hydrophone attached to said a housing, and at least three receiving hydrophones attached to said floatation means.

8. A system as claimed in claim 5, wherein said location means includes a transmitting hydrophone attached to said floatation means, and at least three receiving hydrophones located on said housing.

9. A system as claimed in claim 1, wherein at predetermined intervals one of said transmitters will suspend transmission in order to receive a transmission from another said transmitter to enable clock signals of said transmitters to be calibrated or synchronised.

10. A system as claimed in claim 1, wherein said receiver includes a beam former to minimise interference from any noise emanating from said vessel or object to which said receiver is connected.

11. A system as claimed in claim 1, further including a display means for displaying position information.

12. A system as claimed in claim 1, wherein said housing is connected to an external power source.

13. A system as claimed in claim 1 wherein said transmitters are arranged in a hexagonal, square, diamond, octagonal or triangular shaped grid.

14. A system as claimed in claim 1, wherein said transmitters are spaced apart by a distance equal to or greater than the depth of the aquatic environment.

15. A system as claimed in claim 1, wherein said transmitters are located at least 2 km apart.

16. A system as claimed in claim 1, wherein said housing includes:

a main controller for controlling components in said housing;

a signal processing means for modifying any signals transmitted or received;

a power source to provide power to said housing; and a signal generator to generate said unique signal.

17. A system as claimed in claim 1, wherein said receiver includes:

at least one receiving hydrophone for receiving said unique signals;

a beam former to minimise interference to signals; and a processing means for controlling components in said receiver.

18. A system as claimed in claim 17, wherein said processing means displays the location on a display unit.

19. A system as claimed in claim 1, further including a stationary reference receiver to assist in the locating and positioning of said object.

* * * * *